United States Patent [19]

Koshida et al.

[11] Patent Number: 5,061,290
[45] Date of Patent: Oct. 29, 1991

[54] ROPE DYEING PROCESS USING HALOGEN INDIGO DERIVATIVE AND DYED ARTICLE THUS OBTAINED

[75] Inventors: Hitoshi Koshida; Tetsuo Sakagawa, both of Nishinomiya; Takayuki Nakayama, Amagasaki; Hiroshi Suwa, Kobe, all of Japan

[73] Assignee: Mitsui Toatsu Chemicals, Incorporated, Tokyo, Japan

[21] Appl. No.: 549,303

[22] Filed: Jul. 9, 1990

[30] Foreign Application Priority Data

Jul. 10, 1989 [JP] Japan ................................ 1-175499

[51] Int. Cl.$^5$ ............................. C09B 7/04; D06P 1/22
[52] U.S. Cl. ........................................... 8/653; 8/111; 8/504; 8/918
[58] Field of Search .................................. 8/653, 504

[56] References Cited

U.S. PATENT DOCUMENTS

| 4,198,204 | 4/1980 | von der Eltz et al. | 8/543 |
| 4,613,336 | 9/1986 | Quinnen | 8/494 |
| 4,941,887 | 7/1990 | Sakagawa et al. | 8/642 |
| 5,034,016 | 5/1991 | Koshida | 8/653 |

FOREIGN PATENT DOCUMENTS 343925 11/1989 European Pat. Off. .
393925 11/1989 European Pat. Off. .
2-170861 7/1990 Japan .

OTHER PUBLICATIONS

H. Zollinger, "Color Chemistry" (VCH), 1987, pp. 149, 152–154 and 158–159.
E. R. Trotman, "Dyeing and Chemical Technology of Textile Fibres," Sixth Edition (Wiley-Interscience), 1984, pp. 412, 420.
Colour Index (Third Edition), vol. 4 (Soc. Dyers and Colourists), 1971, p. 4639.

Primary Examiner—A. Lionel Clingman
Attorney, Agent, or Firm—Millen, White & Zelano

[57] ABSTRACT

Disclosed is a dyeing process for rope dyeing denim cotton yarns a fashion blue color which comprises the steps of forming the yarns into a rope; repeatedly immersing the rope in a dye bath containing a reduced water soluble form of a halogenated indigo derivative which is air oxidizable, squeezing the rope to remove dye bath liquid therefrom exposing the damp rope air to air oxidize the reduced form of the indigo derivative in the yarn; and then further oxidizing the incompletely oxidized reduced form of the indigo derivative in the yarn forming the rope in an oxidizing bath containing a chemical oxidant, e.g., sodium perborate.

12 Claims, No Drawings

ROPE DYEING PROCESS USING HALOGEN INDIGO DERIVATIVE AND DYED ARTICLE THUS OBTAINED

BACKGROUND OF THE INVENTION

1. Field of the Invention

The present invention relates to a process for dyeing of cotton yarns, more specifically, to an improved rope dyeing process for fashion dyeing cotton yarns such as denim cotton yarns using an oxidizable indigo derivative, and to the dyed articles thus obtained.

2. Background of the Invention

Denim is a fabric widely used for working clothes, female dresses and children's clothes because of its good feeling and the toughness of the cotton yarn from which the denim is woven.

Of the clothes made of denim fabric, blue jeans are the most prevalent. Reasons why blue jeans are used in large quantities are the unique hue of clothes made from woven fabric dyed with an indigo dye and the change in that hue which occurs with time and washings or by bleaching which are favored so that it is possible to design articles of clothing based on this sensitiveness to hue change In recent years, fashion dyed, i.e., jeans fabricated from denim fabric woven from yarn dyed a clear blue color are in demand as a result of variety and individuality of the fashion.

In order to meet the demand for brilliant blue jeans, many investigations have been made using indigo dyes, but a satisfactory brilliant blue color has not yet been achieved. Research has also been conducted using sulfur dyes, vat dyes, reactive dyes and naphthol dyes. However, the dyeing mechanism of these dyes is very different from indigo dyes and, for this reason, it is difficult to employ these dyes in conventional rope dyeing equipment adapted for use with an indigo dye. In addition, the decoloration effect of these dyes with chlorine bleaching is minimal at best, and therefore the commercial value of the blue jeans dyed with using these dyes is noticeably low.

Indigo derivatives are known which produce a clear hue similar to indigo However, when denim cotton yarns are dyed in rope form with these indigo derivatives in a conventional indigo dyeing process, a brilliant speciality colors and effects cannot be attained.

OBJECTS OF THE INVENTION

An object of the present invention is to provide a rope dyeing process for rope dyeing denim cotton yarns a brilliant blue color using an indigo derivative as the dyestuff. Another object is to provide denim cotton yarns which are dyed a clear reddish blue. A further object is to provide denim fabrics woven therefrom and articles of clothing, e.g., jeans, fabricated from the denim fabric. Other objects will be apparent to those skilled in the art.

SUMMARY OF THE INVENTION

The object of the present invention can be achieved by an improved rope-dying process for denim cotton yarns comprising repeatedly immersing a rope of the yarns in a dye bath containing dissolved therein an air oxidizable reduced soluble form of an indigo derivative which contains a halogen atom such as a bromine atom or a chlorine atom (hereinafter referred to as "indigo derivative"), and which preferably is a compound represented by the general formula (I)

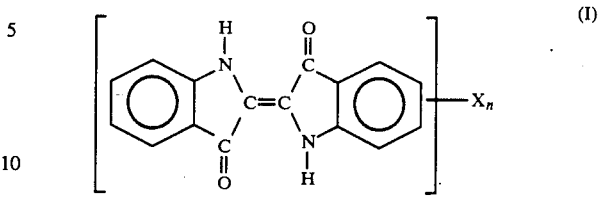

wherein X is a bromine or chlorino atom, and n is an integer of 1 to 6, thereby impregnating the yarn with dye bath liquid, squeezing the impregnated yarn to remove dye bath liquid derivative in the squeezed damp rope; and thereafter further oxidizing the reduced form of the indigo derivate in the squeezed and air oxidized rope in an oxidizing bath containing a chemical oxidant.

The article dyed by the rope-dyeing process of this invention has a brilliant reddish blue color which acceptably decolorizes with a chlorine bleach in a bleaching step and changes in hue with time and washing in a manner similar to indigo dyed fabrics to a commercially acceptable degree.

DETAILED DESCRIPTION OF THE PREFERRED EMBODIMENT

In general, warp yarns for blue jeans denim are dyed continuously by aligning a number of single yarns into a form resembling a single rope, binding them into the form of a tow, winding them into a spherical shape, simultaneously pulling out many warp yarns which have been wound into the spherical shape, guiding the warp yarns into several sets of dye baths which are each filled with a solution of an indigo dye in its reduced form and then repeating the steps of immersion, squeezing and oxidation for short time periods.

The starting indigo derivative is dispersed in fine particles with a dispersant (a lignin or Tamol). In addition, other indigo derivatives can also be used, so long as they are oxidizable in the process of the present invention.

Examples of the starting indigo derivatives are available as the following commercial dye articles:

Mitsui Tsuya Indigo RN (powder) (made by Mitsui Toatsu Dye, Ltd.) and Mitsui Vat Blue HR s/f (fine powder) (made by Mitsui Toatsu Dye, Ltd.) which are 4,8-dibromoindigos of Formula (I) wherein n is 2, and Mitsui Tsuya Indigo 2B (powder) (made by Mitsui Toatsu Dye, Ltd.) and Mikethren Blue ACE s/f (fine powder) (made by Mitsui Toatsu Dye, Ltd.) which are tetrabromoindigos of Formula (I) wherein n is 4. In addition, 4,8-dichloroindigos of Formula (I) are also usable, as are the chloro-bromo analogues.

These indigo derivatives dye the yarn a clearer blue or bluish rod than indigo dye and thus meet the current market demands for denim clothing.

For the purpose of dyeing cotton yarns in rope form, a dye bath containing the above-mentioned indigo derivative in reductant form (hereinafter referred to as the "dye bath") is prepared.

The term "rope form" as used herein means a collection of a plurality of lengths of yarn in untwisted or slightly twisted arrangement. The yarn is twisted in a conventional manner.

The concentration of the indigo derivative in reductant precursor form in the dye bath depends upon a desired dyeing concentration of the material to by dyed in the dye bath. Conveniently, a concentrated solution of the reductant form of the indigo derivative in the range of about 10 to 50 g/l is prepared as a separate bath, and this concentrated solution is then diluted suitably in order to prepare a dye bath having a desired concentration of the reductant precursor, e.g., from about 1 to 5 wt%, preferably about 1 to 3 wt%.

The indigo derivative is reduced in the course of the preparation of the concentrated solution of the soluble form thereof. The reduction of the starting indigo derivative is achieved by the use of a conventional reducing agent, such as hydrosulfite and an alkali, in order to prepare the concentrated solution of the reduced indigo derivative.

There is no particular restriction on the amount of the reducing agent employed so long as the amount thereof maintains the indigo derivative in a reduced state during dyeing. In general, the amount of a hydrosulfite employed is in a range of from about 80 to about 120 wt% based on the indigo derivative. The amount of the alkali employed is excess of the amount required to dissolve the starting indigo derivative. In general, caustic soda is used in an amount of about 80 to 120 wt% based on the starting indigo derivative.

A concentrated solution can be prepared by adding to water, the selected amounts of the indigo derivative, the reducing agent, the alkali and, if necessary, a dyeing auxiliary so that a desired concentration, is obtained, and then reducing the indigo derivative in the solution at 70° C. for about 15 minutes. There is no particular restriction on the temperature and time employed for the reduction but it is desirable to use the conditions described above.

An aqueous solution containing amounts of caustic soda and hydrosulfite effective to maintain the indigo derivative in solution as the reductant precursor thereof is suitably added to the thus prepared concentrated solution of the reduced indigo derivative in order to obtain a dye bath having a desired concentration.

The dyeing process of the present invention is carried out by repeating, e.g., from one to ten times, the steps of immersing the denim cotton yarns in rope form in the abovementioned dye bath, removing the rope from the bath, squeezing the rope to remove dye bath liquid from the rope and exposing the rope to air to air oxidize the reductant precursor in the yarn to an indigo type dye, until the maximum depth of shade obtainable in a reasonable number of repetitions is achieved.

The immersion time of the rope in the dye bath to impregnate the yarns in the rope with the dye bath liquid is short, usually from about 20 to about 60 seconds, and depends upon of the surface area and physical characteristics of the yarn to be dyed.

After the immersion, the cotton yarns are squeezed to remove dye bath liquid physically adhering to the yarn. When the squeezing operation is carried out s that the liquid content of the yarns is in the range of about 50 to 150 % of the dry weight of the yarns, the dyeing effect is improved. The squeezed cotton yarns are then exposed to open air, e.g., for a few seconds or longer, e.g., 1-5 minutes, to develop in the yarn the color of the indigo derivative itself by oxidizing the reduced precursor. The serial steps of immersion, squeezing and the air-oxidation are repeated until the desired color density has been achieved.

In the usual rope dyeing process using indigo as the dye, the above-mentioned serial steps are repeated several times and the dyeing then terminated with the last air-oxidation step. When an indigo derivative is used, however, the deep color inherent in the indigo derivative is obtained only after the dyed cotton yarns are further oxidized in an oxidation bath containing a solution of a chemical oxidant.

Examples of the chemical oxidant used in the present invention are peroxy compounds, including perborates such as sodium perborate and potassium perborate, percarbonates such as sodium percarbonate and potassium percarbonate, and hydrogen peroxide. Above all, sodium perborate is preferable.

The oxidation bath is desirably prepared so as to contain about 2 to 5 g/l of the oxidant. When hydrogen peroxide is used, an oxidation bath containing about 3 to 8 cc/l, based on a 35% aqueous solution thereof preferably is employed. The oxidation treatment is carried out by immersing the cotton yarns which have undergone the last air-oxidadation batchwise or as a continuous length in the oxidation bath at a temperature at which the oxidant is effective, e.g., from about 40° to 70 ° C. until maximum hue enhancement is achieved, e.g., for 20 to 60 seconds. In this way, the oxidation of the indigo derivative is completed After the oxidation, water washing and drying follow in order to obtain the desired dyed article.

In the oxidation treatment, if the concentration of the oxidant is less than 2 g/l, if the temperature is less than 40 ° C., or if the immersion time is less than 20 seconds, the oxidation of the yarns tends to be less than optimum. Conversely, if the temperature exceeds 70 ° C., the oxidant tends to decompose.

The dyeing process of this invention for the first time permits denim cotton yarns to be dyed a brilliant reddish blue color inherent in the indigo derivative. The indigo derivative provides a clearer blue or bluish red hue than indigo, and therefore it can meet the needs of the market for denim cotton yarn thus dyed.

Articles fabricated from the obtained dyed yarn have excellent light resistance and can be decolored with chlorine bleaching. Also, the change in a hue obtained with time and repeated washings is very close to that of dyed articles obtained using indigo dye.

The dyed cotton yarns can be twilled with undyed yarns or dyed yarns in order to prepare brilliant reddish blue denim fabric and the latter can be used to fabricate brilliant reddish blue jeans. These blue jeans can meet the needs of the market.

The present invention will now be described with reference to examples, in which parts are based on weight, unless otherwise specified.

EXAMPLE 1

Twenty parts of Mikethren Blue ACE s/f (made by Mitsui Toatsu Dye, Ltd.), 20 parts of solid caustic soda and 20 parts of sodium hydrosulfite were added to an amount of water required to prepare 1,000 parts of a solution thereof. This solution was then heated at 70 ° C. for 15 minutes in order to concentrate and reduce the solution. One part of sodium hydrosulfite, 0.5 part of caustic soda in an amount of water which when added to 60 parts of this concentrate provided 1,000 parts of a dye bath.

A rope of denim cotton yarns which had been washed with warm a water was immersed into the dye bath prepared above, squeezed damp dry in a mangle, and then aired for 90 seconds. The serial steps of immersion, squeezing and airing were repeated 6 times, and the yarns were then immersed in a 3 g/l aqueous solution of sodium perborate at 60° C. for 30 seconds to effect further oxidation. The yarns were then washed with water and dried, thereby obtaining brilliant reddish blue denim cotton yarns. The thus obtained dyed yarns had excellent light resistance. Furthermore, when the yarns were immersed in a 3 g/l aqueous sodium hypochlorite solution containing 10% available chlorine at 40° C. for 20 minutes, the desired decoloration effect from blue to white was obtained.

EXAMPLE 2

A concentrated original solution was prepared in the same manner as in Example 1, except the Mikethren Blue ACE s/f was replaced by 15 parts of Mitsui Tsuya Indigo 2B (made by Mitsui Toatsu Dye, Ltd.). The dyeing operation was carried out as in Example 1 and brilliant reddish blue denim cotton yarns were obtained as in Example 1. The thus obtained dyed yarns had excellent light resistance. Furthermore, when the yarns were immersed for 20 minutes in a 3 g/l aqueous sodium hypochlorite solution containing 10% available chlorine at 40° C., the desired decoloration effect from blue to white was obtained.

EXAMPLE 3

The procedure of Example 1 was followed, except 50 parts of Mitsui Vat Blue HR s/f (made by Mitsui Toatsu Dye, Ltd.) were employed and 50 parts of solid caustic soda and 50 parts of hydrosulfite and an appropriate amount of water were employed to prepare the 1,000 parts of dye bath solution, brilliant reddish blue denim cotton yarns were obtained, as in Example 1. The thus obtained dyed yarns had excellent light resistance and when the yarns were immersed in a 3 g/l aqueous sodium hypochlorite solution containing 10% available chlorine at 40° C. for 20 minutes, the desired decoloration effect from blue to white was obtained.

EXAMPLE 4

The procedure of Example 1 was followed, except 40 parts of Mitsui Tsuya Indigo RN (made by Mitsui Toatsu Dye, Ltd.) was employed. Brilliant reddish blue denim cotton yarns were obtained as in Example 1. The thus obtained dyed yarns had excellent light resistance and, when the yarns were immersed in a 3 g/l aqueous sodium hypochlorite solution containing 10% available chlorine at 40° C. for 20 minutes, the desired decoloration effect of from blue to white was obtained.

EXAMPLE 5

The procedure of Example 1 was followed, except 15 parts of 4,8-dichloroindigo was employed. Brilliant reddish blue denim cotton yarns were obtained as in Example 1. The thus obtained dyed yarns had excellent light resistance and when the yarns were immersed in a 3 g/l aqueous sodium hypochlorite solution containing 10% available chlorine at 40° C. for 20 minutes, tho desired decoloration effect of from blue to white was obtained.

EXAMPLE 6

The procedure of Example 1 was followed, except 15 parts of tetrachloroindigo (C.I. Vat Blue 41) was employed. Brilliant reddish blue denim cotton yarns were obtained as in Example 1. The thus obtained dyed yarns had excellent light resistance and, when the yarns were immersed in a 3 g/l aqueous sodium hypochlorite solution containing 10% available chlorine at 40° C. for 20 minutes, the desired decoloration effect of from blue to white was obtained.

COMPARATIVE EXAMPLE 1

The denim cotton yarns were dyed using C.I. Vat Blue 6 (Mikethren Blue BC s/f; made by Mitsui Toatsu Dye, Ltd.), a typical blue vat dye not within the scope of Formula (I) in the same manner as in the Examples.

In order to compare the dyed cotton yarns with those obtained in Example 1, the condition of the dyed yarns was observed and the decoloration test were carried out as follows:

Dyeing condition of the yarns: The dyed yarns were cut with a cutter and the cross section of the cut yarn was examined.

Decoloration Test: The yarns were immersed in a 3 g/l aqueous sodium hypochlorite solution containing 10% available chlorine at 40° C. for 20 minutes The results are set forth in Table 1.

TABLE 1

| | Comp. Ex. 1 | Example 1 |
| --- | --- | --- |
| Condition of Dyed Yarn | The yarn was dyed blue all over from the surface to the center thereof. | The surface of the yarn was dyed brilliant reddish blue in the form of a ring, but the center thereof was not dyed. The so-called central white was observed. |
| Decoloration Test | In the decoloration test, an acceptable level of decoloration was not achieved, and a blue hue remained perceptibly. | After decoloration, the dyed yarns became faint on the whole, and the hue was whitish blue. |

COMPARATIVE EXAMPLE 2

The same procedure as in Example 1 was employed except that the immersion oxidation in aqueous sodium perborate solution was omitted. The cotton yarns were dyed greenish dark blue. As a result of a test by the use of a gray scale, dyed color obtained was one grade lower compared with that of Example 1. Therefore, the dyed yarns obtained in Comparative Example 2 did not meet the market demand for brilliant reddish blue and were much poorer from a commercial value point of view compared with the dyed yarn obtained in Example 1.

As is apparent from the results obtained in the Examples and the Comparative Examples, when yarn rope dyed with an aqueous oxidant solution after the dyeing step using an otherwise conventional rope dyeing method, the denim cotton yarns which are dyed a brilliant reddish blue hue inherently obtainable with the indigo derivatives can be obtained Furthermore, by observing the dyed condition of the cotton yarns, it is confirmed that the yarn treated in Comparative Example 1 is dyed up to the central portion whereas in accordance with the present invention, the yarn is dyed only on the surface thereof and not in the central portion (cf. Table 1). For this reason, it is possible to partially decolor the dyed yarns by stone washing, whereby blue jeans can be made which have a unique hue, i.e., a mixed color of blue and white.

Additionally, the hue of the cotton yarns because the yarn dyed in accordance with the Examples, which have been subjected to the decoloration test is whitish blue in contrast to Comparative Example 1 in which the blue hue remains, denim cotton yarns dyed in accordance with the Examples provide a convenient way to produce blue jeans with fashion patterns.

What is claimed is:

1. A process for rope-dyeing cotton yarn which comprising repeatedly immersing a rope of the yarns in an aqueous dye bath containing dissolved therein an air oxidizable reduced soluble form of an indigo derivative of the formula

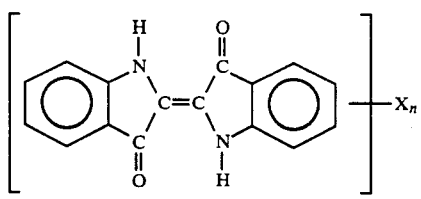

wherein X is a bromine or chlorine atom, and n is an integer from 1 to 6, squeezing dye bath liquid therefrom and air oxidizing the reduced form of indigo derivative in squeezed damp rope; and thereafter further oxidizing the reduced form of the indigo derivative in the squeezed and air oxidized rope in an oxidizing bath containing a chemical oxidant.

2. The process of claim 1 wherein the oxidant is selected from the group consisting of perborates, percarbonates and hydrogen peroxide.

3. The process of claim 2 wherein the oxidant is sodium perborate.

4. The process of claim 2 wherein the aqueous dye concentration of the oxidant in the bath is about 2 t 5 g/l.

5. The process of claim 1 wherein the oxidation with the oxidant is carried out by immersing the air oxidized rope in the aqueous dye bath at a temperature of from 40° to 70° C. for a period of 20 to 60 seconds.

6. The process of claim wherein the steps are conducted continuously with a continuous length of rope.

7. The process of claim 1 wherein X is a bromine atom, and n is 2 or 4.

8. The process of claim 7 wherein the oxidant is sodium perborate.

9. A dyed denim yarn obtained according to the process of claim 1.

10. A denim fabric woven from denim yarn obtained according to the process of claim 1.

11. A fashion bleached fabric according to claim 1.

12. Denim jeans fashioned from fabric according to claim 1.

* * * * *